May 5, 1925.

G. SCHEIB 1,536,272

COVER FOR HIGH PRESSURE VESSELS

Original Filed Aug. 29, 1921    2 Sheets-Sheet 1

Inventor:
Georg Scheib
by
Attorney

May 5, 1925.

G. SCHEIB 1,536,272

COVER FOR HIGH PRESSURE VESSELS

Original Filed Aug. 29, 1921      2 Sheets-Sheet 2

Inventor:
G. Scheib

Patented May 5, 1925.

1,536,272

UNITED STATES PATENT OFFICE.

GEORG SCHEIB, OF BERLIN, GERMANY, ASSIGNOR TO D. H. J. VAN MENS, OF THE HAGUE, NETHERLANDS, AND J. G. SCHURMANN, OF ROTTERDAM, NETHERLANDS.

COVER FOR HIGH-PRESSURE VESSELS.

Application filed August 29, 1921, Serial No. 496,786. Renewed March 6, 1925.

*To all whom it may concern:*

Be it known that I, GEORG SCHEIB, residing at Berlin, O. 27, Germany, 18 Marcusstrasse, have invented certain new and useful Improvements in Covers for High-Pressure Vessels, of which the following is a specification.

Concerning detachable covers or closures for large receptacle apertures, generally, in the case of high internal pressure, vaulted bottoms of rolled material, with or without flanges, are made use of. The changes of shape caused by that high pressure, as well as by the large dimensions of such closures, are obviated by thick walls, also by exterior stiffenings. Double-walled covers of cast material have not proved suited for conditions of the kind in question as they are not sufficiently secure in view of the internal tensions that may exist.

As regards man-holes, i. e., comparatively small apertures, a closure has become known consisting of two vaulted covers detachably connected with each other in their centres by a threaded bolt. The closing cover proper which is the outer one and is subjected to the internal pressure is pressed against the outer edge of the receptacle aperture by the inner cover which acts as a kind of yoke and is drawn against the inner surface of the receptacle, the tightening being effected by channel-shaped grooves or by correspondingly shaped feathers or their equivalents. Such a construction, however, where the outer cover which is held merely by the central bolt is capable of yielding elastically at its rim outwards under the internal pressure is useless for apertures of large diameter and where the inner pressure is high.

Similar covers or closures are secured in place either from the outside by means of flanges or screws, or the internal pressure is used to press them against their seats at the aperture to be closed. At any rate, rather many screws are required to make up for the changes of shape which the pressure exerted upon the cover tends to bring about, and the necessity may arise to draw these screws home even during service.

The present invention now relates to a cover or closure which is intended for large apertures and for high internal pressure and may be quickly put into, and out of, service. The construction of this novel and improved closure is such that changes of shape are prevented in such a degree that the tightness of the closure is not impaired, even if no screws are employed. The internal pressure is used to press an oval cover against its seat, there being merely a restricted number of screws used which take up the weight of the cover and press it against its seat prior to the action of that pressure.

That novel closure is employed in connection with a special device by which attaching and detaching the cover is greatly facilitated in that it is given thereby such movements and positions as are suited and necessary for the purpose in view.

The novel cover for the quick closure consists of two slightly vaulted sheet-metal plates of about equal shape and thickness which are firmly connected with each other at their rims by means of rivets or in any other manner, there being formed between them a hollow space corresponding to the vaults. The arrangement is such that that plate which is directly subjected to the internal pressure of the receptacle causes at the other plate, by the horizontal forces produced by that pressure, equally great horizontal forces at the rim thereof so that both plates are bent through in the same measure but in opposite sense and both are, therefore, subjected to the internal pressure, one directly, the other indirectly. The two plates may be connected with each other also at places remote from the rim, at several places or only at one, for instance in the centre of the plates. Such connections may be effected by rigid intermediate pieces traversing the space between the vaulted plates, the bending through of the two plates being in that case equally great.

The resistibility of closures or double-covers of this kind may be correspondingly increased by the use of a shrinkage ring, that is to say, by applying a ring projecting beyond the rim or edge of the outer vaulted plate, the other vaulted plate which is directed towards the respective receptacle being inserted into the projecting part of said ring; and there is, besides, provided a plane sheet-metal plate which is arranged between the two vaulted plates and is firmly connected with the same, there being, however, in this latter case no stiffening bolt or bolts between any of the vaulted plates and the flat one, such bolt or bolts passing, if provided through holes provided for this purpose in the plane sheet-metal plate. The horizontal forces arising at the rim of that vaulted plate which is directly subjected to the internal pressure are taken up by the shrinkage ring, the projecting ring of the outer vaulted plate, or by the plane flat intermediate plate; in the latter two cases they are compensated for the greatest part by the horizontal forces arising in the rim of the other vaulted plate or of the flat intermediate plate. As this plate undergoes nearly no changes of shape at all, such a form of construction is stiffer than the first-mentioned ones where there is a certain degree of elasticity especially if no stiffening bolts are provided within the space between the vaults, and it is especially suited for cases where the internal pressure of the receptacle varies quickly and, perhaps, in wide limits.

In contradistinction to single covers which are intended for large receptacle apertures and are strongly vaulted, the novel closure requires but slight vaults without flanges so that the material is correspondingly less subjected to stresses during the shaping. The sheet-metal may be thinner and is subjected to smaller changes of shape during service under pressure whereby the service security is greatly increased. Closures or double-covers of this kind are suited for circular apertures, as well as for oval ones, and another advantage is that owing to their great resistibility the changes of shape that may occur remain in admissible limits. Besides, as but a few screws are required to fasten them, attaching and detaching requires by far less time.

An easy and expeditious attachment of the cover, is ensured by forming the middle stay-bolt of same with a screw-threaded prolongation fitted with a hinged strap carrying worm-driven gear with ball-bearings, such mechanism permits of swinging the cover in a satisfactory manner and of retaining same in any desired position.

In the annexed drawing.

Figure 1:
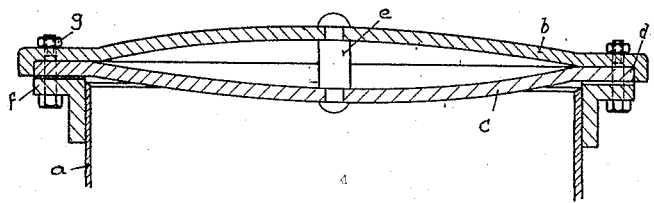
Fig. 1 shows an outside cover for a circular aperture.

In Fig. 1, $a$ is the vessel of circular form; $b$ is the top member of the cover having an overturned edge; $c$ is the lower member of the cover firmly pressed into the same member $b$; $d$ is a packing placed between $b$ and $c$; $e$ is a stay-bolt riveted to the two members of the cover and firmly uniting the summits of $b$ and $c$; $f$ is the packing between the vessel $a$ and its cover $b$, $c$; $g$ are the ordinary but less numerous fastening screws.

The fixing of the cover on the vessel may be otherwise effected, by wedges and so forth. In large covers the mutual stiffening action by the cover-portions is ensured by means of two or more stay-bolts.

Figure 2:
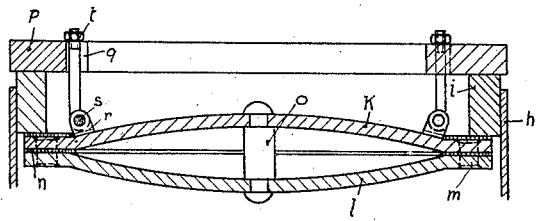
Figs. 2 and 3 show inside covers for oval apertures.

In Fig. 2, $h$ is a vessel with oval aperture having a riveted ring $i$; $k$ and $l$ are the two members of the cover fixed together by rivets $m$ and rendered tight by a packing $n$; $o$ is the stay-bolt riveted in and connecting together the two members $k$ and $l$ of the cover; $p$ is a tie-ring, which may be in two parts held together by easily releasable connections such as clamps or the like, and which in slots $q$ receive screws $t$ turnable in bolts $s$ in lugs $r$ which are fast on the cover $k$.

Figure 3:
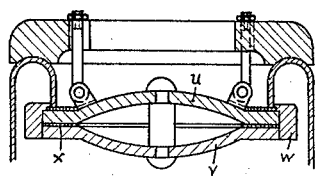

Fig. 3 shows a similar arrangement to that of Fig. 2, only the connection between the cover-portions is different; the two convex members $u$ and $v$ are both pressed into one and the same ring $w$ with an intervening packing $x$.

Figure 4:
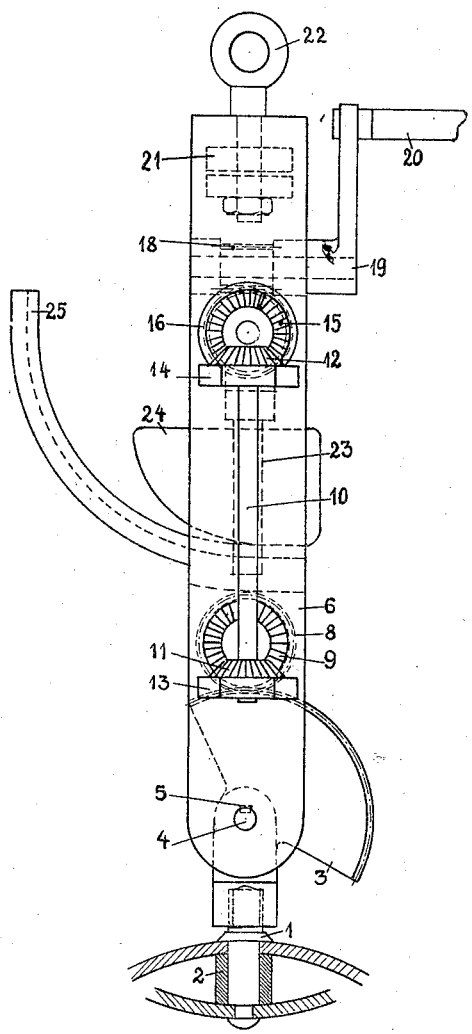
Figs. 4 and 5 show views of the arrangement and attachment of a hinged strap with ball-bearings secured to a prolonged stay-bolt.
Figure 5:
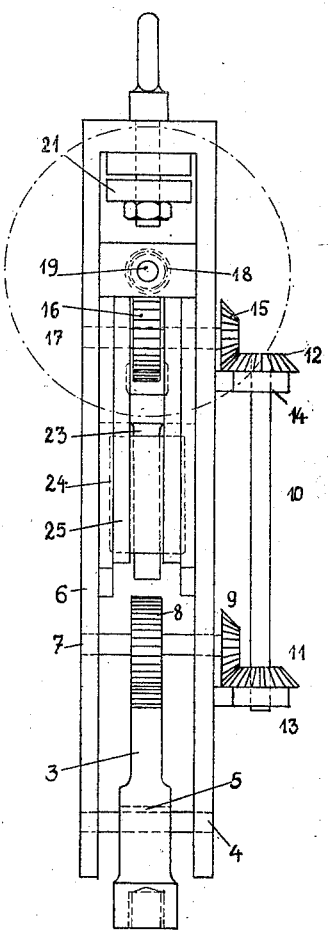

In Figs. 4 and 5 which serve in mounting covers of the aforesaid construction, 1 denotes the extended screw-threaded stay-bolt connecting the summits of the cover-portions; 2 is a distance sleeve upon the stay-bolt; 3 is the hinge-lug bored to fit the screw of the stay-bolt and also forming a toothed sector; 4 is the hinge-pin keyed in the eye of the lug; 5 being the key for preventing the said pin from turning and only allowing the strap 6 to swing. In the strap 6 is mounted loose a shaft 7 on which is firmly keyed a spur wheel 8 as well as an outside mitre wheel 9, said spur wheel being in gear with the toothed segment 3. To the outside of one leg of the strap 6 is secured a lay-shaft 10 fitted with two mitre wheels 11 and 12 and bedded in bearings 13 and 14. The mitre wheels 9 and 11 as likewise the mitre wheel 12 and a further mitre wheel 15 are geared together. The mitre wheel 15 and a worm wheel 16 are keyed on a shaft 17 mounted in the strap 6. The worm wheel 16, situated between the legs of the strap 6, receives motion from a worm 18 which is fast on the shaft 19 of the hand-crank 20. The bridge of the strap 6 is fitted with an eye-bolt 22 turning on a ball bearing 21.

On the shaft 17 is keyed a forked lever 23 straddling over the worm wheel 16 and fitted with a balance weight 24 which is slidable on said lever and guided in curved arms 25 fast on the two legs of the strap 6.

For use, the device is suspended by pulley block and is secured to the stay-bolt 1 of the cover. The cover can be moved into any suitable position for its attachment by turning the hand-crank 20. The hand-crank 20 transmits its motion to the worm 18 which turns the worm-wheel 16, mitre wheels 15, 12, shaft 10, mitre wheel 11 and then further rotates the mitre wheel 9 and spur wheel 8 which operates the toothed segment of the hinged-lug 3. The worm gear must be self-locking so as to retain the cover in any inclined position which may only be altered by the turning of the hand-crank. Any necessary turning of the cover around the vertical line can be done by means of the ball-bearing 21.

The weight 24, whose lever follows the turning of the worm wheel and its guidance in the arms 25 is to be such as to keep the strap 6 about vertical for all inclinations of the cover.

The drive of the worm may, instead of by hand, be effected by electromotor directly coupled to the worm shaft and mounted on the strap 6.

We claim:—

1. A quick-obturator for receptacles having a large aperture and high internal pressure, comprising, in combination: an oval cover adapted to be pressed against the inner rim of said aperture by the internal pressure and being composed of two slightly vaulted members of equal thickness riveted together at their rims and enclosing a hollow space; a tensioning ring arranged on the outer rim of the receptacle, threaded bolts arranged in slots of the tensioning ring; nuts upon said bolts; eyes and bolts connecting said first-mentioned bolts with the cover at the outer surface thereof; said threaded bolts connecting the cover with the tensioning ring and pressing the cover against the inner receptacle rim; a stay bolt arranged in the middle of the cover and traversing said cover space and connecting the two cover members with each other; a spacing tube upon said bolt; means for attaching the said cover to, and detaching it from the receptacle; a threaded pivot forming an elongation of said stay bolt on the outer surface of the cover; a toothed segment supported in a fork provided with a ball-bearing and an ear and provided with a lever firmly connected with the said stay bolt of the cover; a cog-wheel meshing with said toothed sector and being supported in said fork and adapted to readjust the sector and the cover; a bevel-wheel on the shaft of said cog-wheel, this shaft being arranged on one side of the fork; two bevel-wheels thereon; a worm-wheel and a self-checking worm meshing with the worm; a bevel-wheel on the shaft of the worm-wheel, one of the bevel-wheels of the first-mentioned shaft meshing with the bevel-wheel of the cog-wheel shaft and the other meshing with the bevel-wheel of the worm-wheel shaft; a crank on the bevel-wheel supported in the fork; a lever secured to the bevel-wheel shaft and being adapted to be actuated by the same; a compensating weight so arranged as to be adapted to be re-adjusted by this lever and to balance the cover in its various positions; and guide arms secured to the two legs of the fork and intended for said weight, as set forth.

2. A quick-obturator for receptacles having a large aperture and high internal pressure, comprising, in combination: an oval cover adapted to be pressed against the inner rim of said aperture by the internal pressure and being composed of two slightly vaulted members of equal thickness riveted together at their rims and enclosing a hollow space; a shrinkage ring surrounding said two cover-members; a tensioning ring arranged on the outer rim of the receptacle; threaded bolts arranged in slots of the tensioning ring; nuts upon said bolts; eyes and bolts connecting said first-mentioned bolts with the cover at the outer surface thereof; said threaded bolts connecting the cover with the tensioning ring and pressing it against the inner receptacle rim; a plurality of stay bolts extending through the cover space, one of them being located in the centre of the cover members and connecting the two cover members with each other; a spacing tube on said central stay bolt; means for attaching the said cover to, and detaching it from the receptacle and means for attaching the cover to the receptacle, substantially as shown and described.

3. A quick-obturator for receptacles having a large aperture and high internal pressure, comprising, in combination: an oval cover adapted to be pressed against the inner rim of said aperture by the internal pressure and being composed of two slightly vaulted members of equal thickness, one of said members being turned round inwardly at its rim, and the other being held fast by this rim; the members enclosing a hollow space; a tensioning ring arranged on the outer rim of the receptacle; threaded bolts arranged in slots of the tensioning ring; nuts upon said bolts; eyes and bolts connecting said first-mentioned bolts with the cover at the outer surface thereof; said threaded bolts connecting the cover with the tensioning ring and pressing the cover against the inner receptacle rim; a stay bolt arranged in the middle of the cover and traversing said cover space and connecting the two cover members with each other; a spacing tube upon said bolt; means for attaching the said cover to, and detaching it from, the receptacle, substantially as shown and described.

Dated this 9th day of August, 1921.

In testimony whereof I affixed my signature in presence of two witnesses.

GEORG SCHEIB.

Witness:
W. SUALET.